K. J. THORSBY.
SLIDE GATE.
APPLICATION FILED AUG. 7, 1912.

1,054,150.  Patented Feb. 25, 1913.

WITNESSES
F. C. Fliedner
S. Constine

INVENTOR
Karl Johan Thorsby
BY
Wm. F. Booth
his ATTORNEY

UNITED STATES PATENT OFFICE.

KARL JOHAN THORSBY, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

SLIDE-GATE.

1,054,150.      Specification of Letters Patent.      Patented Feb. 25, 1913.

Application filed August 7, 1912. Serial No. 713,798.

*To all whom it may concern:*

Be it known that I, KARL JOHAN THORSBY, a subject of the King of Norway, residing at Oakland, in the county of Alameda and State of California, have invented certain new and useful Improvements in Slide-Gates, of which the following is a specification.

My invention relates to the class of slide-gates, and is adapted for use in connection with fluid pipes for any purpose, being especially adapted for pipes used in irrigation systems.

My invention though applicable to pipes of various forms is particularly useful in connection with corrugated pipes.

The object of the invention is to provide a gate economical in manufacture, simple in construction, durable in use, effective in operation, guarding against leakage, closing freely and not liable to get out of order.

To this end my invention consists in the novel gate which I shall hereinafter fully describe by reference to the accompanying drawings in which—

Figure 1:
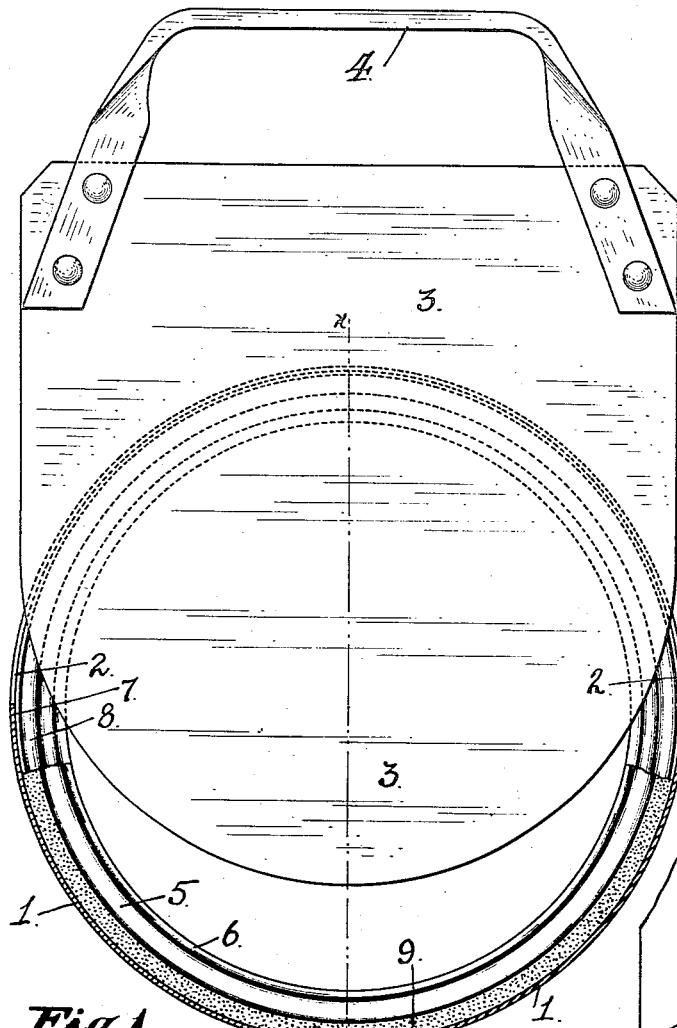
Figure 2:
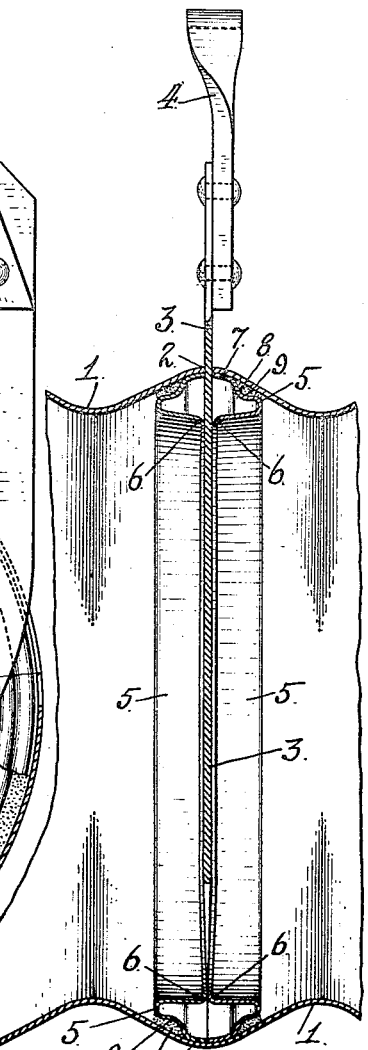
Figure 3:
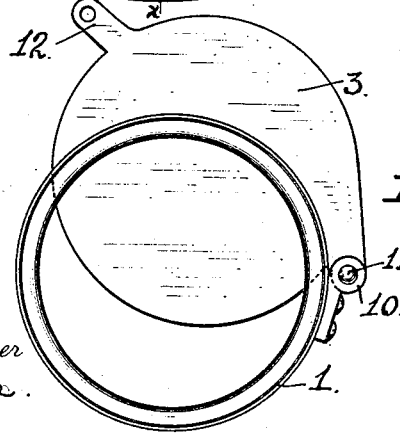

Figure 1 is an end view, partly in section, of my slide-gate. Fig. 2 is a section of the same on the line x—x of Fig. 1. Fig. 3 is an end view showing a modification in the manner of mounting the slide.

For convenience, the gate is shown in a partly open position.

Referring to Figs. 1 and 2, 1 is a pipe which is here shown as of the corrugated type. Corrugated pipe best lends itself to the proper seating of the gate, in that it presents an interior valley in which the seating members rest; but my invention is not confined to this form of pipe, as said seating members may properly be disposed within other pipes.

The pipe 1 is provided with a cross-slot 2 with a width just sufficient to receive the slide 3. This slot has a length equal to half the circumference of the pipe, and the slide 3 has a shape adapting it to fit the lower half of the pipe whatever may be the shape in cross section of said pipe.

The slide shown in Figs. 1 and 2 moves vertically, and a handle 4 is shown as the lifting means for said slide.

5 are the seating members for the slide. These are here shown to rest in a valley of the corrugated pipe. These members may be of various shapes in cross section, but the form I prefer is that here shown, namely, members stamped out of sheet metal of annular design each member being bent upon itself, one member complementing the other, meeting normally at their adjacent edges, and formed at their meeting edges of lesser diameters with inward curvatures 6, and at their meeting edges of greater diameters with curves 7 to conform to the valley of the pipe; and between said last named edges and their sides they are formed with inward curves 8 which provide recesses in which suitable packing 9 is placed, which when the pipe is clamped on said seating members 5 is pressed hard between said members and the pipe and make a water tight joint. The seating members 5 thus formed are of a springy nature, and the inward curvatures 6 which follow the said seating members all around their inner circumference will always be pressed against each other on account of the springy nature of said members, when the slide 3 is out. Consequently, when the slide 3 is forced in between the seating members, the latter are pressed against the slide and keep it in any position; and when the slide is closed they will make a water tight bearing all around the contact surface. This construction thus provides a slide gate with durable and effective seating members for the slide which will guard against leakage and will allow the pressure to act in either direction on said slide when the latter is in a closed position. Furthermore, the seating members serve as a guide for the slide and will keep it in any position desired without other assistance, and in this way make a simple, inexpensive and faultless device for holding the slide.

In Fig. 3 I show a modification in the manner of mounting the slide, which consists in hinging it to the pipe, so that instead of moving vertically in straight lines, it opens and closes by a swinging movement about its hinge. To effect this mounting, lugs 10 are secured to the exterior of the pipe 1, near one extremity of its cross-slot, and the slide, which is here designated by the same numeral 3, is pivoted at one side in said lugs at 11. An extension 12 on the opposite side of the slide may be connected to any suitable lifting device.

Having thus described my invention, what I claim as new and desire to secure by Letters Patent is:—

1. In a slide-gate for pipes, the combination of a pipe having a cross-slot; a slide adapted to move in said slot to close and open the pipe; and seating members within the pipe disposed to bear on each side of the slide, said members being composed of annular, complemental, springy rings, bent upon themselves and adapted to yield to receive the slide between them.

2. In a slide-gate for pipes, the combination of a pipe having a cross-slot; a slide adapted to move in said slot to close and open the pipe; and seating members within the pipe disposed to bear on each side of the slide, said members being composed of annular, complemental, springy rings, bent upon themselves, and formed at their meeting edges of lesser diameters with inward curvatures adapted to yield to receive the slide between them.

3. In a slide-gate for pipes, the combination of a pipe having a cross-slot; a slide adapted to move in said slot to close and open the pipe; and seating members within the pipe disposed to bear on each side of the slide, said members being composed of annular, complemental, springy rings, bent upon themselves and adapted to yield to receive the pipe between them, each member being formed in its outer face with an inward curve to provide a recess between itself and the pipe; and packing seated in said recess.

4. In a slide-gate for pipes, the combination of a pipe having a cross-slot; a slide adapted to move in said slot to close and open the pipe; seating members within the pipe disposed to bear on each side of the slide, said members being composed of annular, complemental, springy rings, bent upon themselves, and formed at their meeting edges of lesser diameters with inward curvatures adapted to receive the slide between them, each member being formed in its outer face with an inward curve to provide a recess between itself and the pipe; and packing seated in said recess.

5. In a slide-gate for pipes, the combination of a pipe having a cross-slot; a slide adapted to move in said slot to close and open the pipe; and seating members within the pipe disposed to bear on each side of the slide, said members being composed of annular, complemental, springy rings, bent upon themselves and adapted to yield to receive the slide between them, said members having at their meeting edges of greater diameters an outer face conforming to the surface of the pipe in which said members rest.

6. In a slide-gate for pipes, the combination of a corrugated pipe having a cross-slot through the ridge of one of its corrugations; a slide adapted to move in said slot to close and open the pipe; and seating members within the interior valley of the pipe corresponding to the ridge in which the cross-slot is made, said members being composed of annular, complemental, springy rings, bent upon themselves and adapted to yield to receive the slide between them, said members having at their outer meeting edges of greater diameters an outer face conforming to the surface of the valley of the pipe in which said members rest.

7. In a slide-gate for pipes, the combination of a corrugated pipe having a cross-slot through the ridge of one of its corrugations; a slide adapted to move in said slot to close and open the pipe; seating members within the interior valley of the pipe corresponding to the ridge in which the cross-slot is made, said members being composed of annular, complemental, springy rings bent upon themselves and adapted to yield to receive the slide between them, each of said members having at their outer meeting edges of greater diameters an outer face conforming to the surface of the valley of the pipe in which said members rest, and each member having also on its outer face an inward curve to provide a recess between itself and the surface of said pipe-valley; and packing seated in said recess.

In testimony whereof I have signed my name to this specification in the presence of two subscribing witnesses.

KARL JOHAN THORSBY.

Witnesses:
L. A. FORD,
C. R. HODGKIN.